United States Patent

[11] 3,616,158

[72] Inventor
[21] Appl. No. 758,509
[22] Filed Sept. 9, 1968
[45] Patented Oct. 26, 1971
[73] Assignees Louis C. Rubens
Midland, Mich.;
The Dow Chemical Company
Midland, Mich.

[54] CUSHION-PACKAGING MATERIAL
10 Claims, 3 Drawing Figs.

[52] U.S. Cl. .................................................. 161/127,
156/79, 161/130, 161/161, 206/47
[51] Int. Cl. .................................................... B32b 1/00,
B32b 3/26, B32b 27/00
[50] Field of Search .......................................... 161/124,
127, 146, 148, 161, 162, 168; 264/45, 49, 51;
156/79, 290, 291; 229/14 C; 206/46 FC, 47

[56] References Cited
UNITED STATES PATENTS
| 2,848,428 | 8/1958 | Rubens | 260/2.5 |
| 2,989,783 | 6/1961 | Slapnik | 264/45 |
| 3,060,513 | 10/1962 | Klink et al. | 206/46 FC |
| 3,110,552 | 11/1963 | Voelker | 264/45 |
| 3,294,602 | 12/1966 | Francis et al. | 156/79 UX |
| 3,329,750 | 7/1967 | Growald | 264/45 |
| 3,389,195 | 6/1968 | Gianakos et al. | 156/79 X |
| 3,419,134 | 12/1968 | Fitts | 206/46 FC |

FOREIGN PATENTS
| 922,547 | 4/1963 | Great Britain | 161/168 |

Primary Examiner—William A. Powell
Attorneys—Griswold & Burdick, Richard C. Waterman and Burke M. Halldorson ABSTRACT: An effective flexible cushion-packaging material is obtained by sealing together upper and lower layers of film in a diamond, rectangular, circular or a like shaped pattern to form a plurality of individual compartments or packets, and encapsulating in each compartment particles of an expandable synthetic resinous thermoplastic material. The particles in their nonexpanded condition occupy a small volume and the composite material can be tightly rolled or packaged in a dense state for shipment or storage. When the material is to be used, it is passed into a heating zone, as for example, between the electrodes of a high-frequency dielectric heating unit to cause rapid expansion of the particles to a low density cellular state.

PATENTED OCT 26 1971

3,616,158

INVENTOR.
Louis C Rubens

BY

Burk M Halldoron

ATTORNEY

CUSHION-PACKAGING MATERIAL

DESCRIPTION OF THE INVENTION

Flexible cushion-packaging materials are useful for cushioning and shock-absorbing applications, as for example, as padding for delicate objects such as furniture, lamps, tableware and the like. Conventionally this material is obtained by encapsulating air in plurality of small cells formed between upper and lower layers of films and with the films sealed together peripherally about each cell. The effective utilization of such prior art packaging material is limited by several factors 1. A high volume to weight ratio which renders the material costly to ship and store prior to useage;
2. Air leakage from the cells either by accidental puncture, or from slow leakage when the cells are subjected to compression; and
3. The need of using high gas barrier films to minimize air leakage from the cells.

An obvious solution to (1) above would be onsite fabrication, i.e. at the packaging plant. Onsite fabrication, however, would frequently be undesirable, since it would often result in a loss of the favorable economics associated with large scale productions employing sophisticated high speed apparatus.

Accordingly, it is an object of the present invention to provide an improved flexible cushion-packaging material which in an initial state, is relatively dense for shipping and storage advantages.

Another object of the present invention is to provide such packaging material wherein the material is readily expandable to a low density, cellular state and in which state it is useable for cushioning and shocking-absorbing applications, as for example, as padding for delicate objects and the like.

Yet another object of the present invention is to provide such packaging materials wherein the construction of the material is such as to eliminate the problems associated with air leakage or loss.

Yet a further object of the present invention is to provide an improved method for providing packages with effective flexible cushioning packaging materials.

Briefly then, and in accordance with the present invention, an improved flexible cushion-packaging material is prepared in an initial relatively dense, low volume state, by sealing together upper and lower layers of film in a diamond, square, circular, or like shaped pattern to form a plurality of similarly shaped individual packets or compartments, and encapsulating in each compartment an expandable synthetic resinous thermoplastic material. The composite material including the nonexpanded particles, can be tightly rolled or packaged to obtain economics in shipments and storage. When the material is to be used, the expandable particles are foamed or expanded to a low density cellular state whereby the material is made ready for usage in cushioning and shock-absorbing applications. In the preferred form of the invention, expandable particles which will heat up and foam rapidly in a high-frequency electrical field are used in combination with films formed of low-dielectric loss materials, that is, materials that are relatively uneffected temperaturewise when placed in such a field. In other embodiments, expandable particles are selected which foam at a temperature less then at which serious degrading or damaging of the films would occur. Radiation-heating techniques (i.e. by dosages of infrared rays) are also applicable whereby the radiation penetrates through the film to heat and expand the particles.

Other objects and advantages of the present invention and its details of construction will be apparent from a consideration of the following specification and accompanying drawings wherein.

Figure 1:
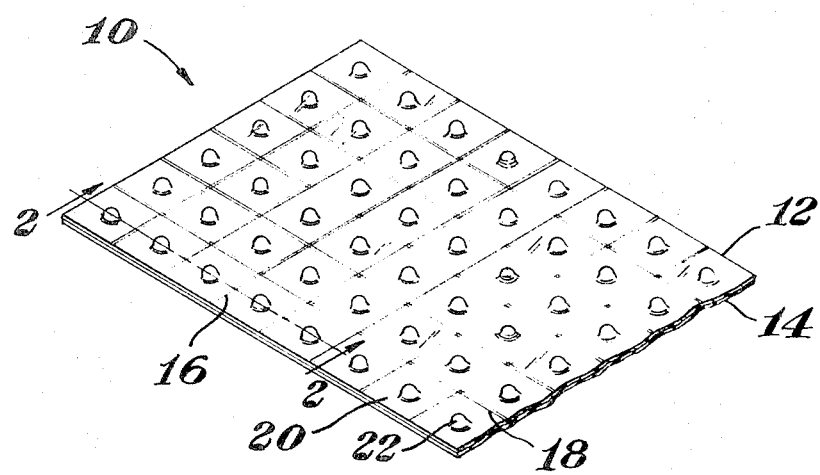
FIG. 1 is an isometric view of flexible cushion packaging material constructed according to the principles of the present invention and shows the expandable particles in their initial relatively dense state.
Figure 2:
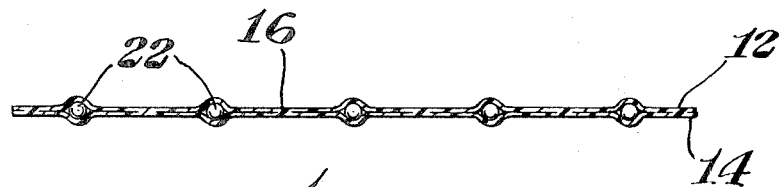
FIG. 2 is a cross-sectional view of the packaging material of FIG. 1 taken along reference line 2—2 thereof.

Referring now more particularly to the drawings there is shown in FIGS. 1 and 2, a length of flexible cushion-packaging material 10 in its initial relatively dense, low volume state, and including upper and lower layers of films 12 and 14, respectively, disposed in superposed relationship. Film layers 12 and 14 are joined together by a crisscross network or matrix of seals 16 and 18 which divide the two films into a plurality of rectangularly shaped compartments or packets 20. More specifically, seals 16 extend laterally across packaging material 10 in aligned spaced relationship with each other, while seals 18 extend transversely to seals 16, crossing the same at right angles. Seals 18 are likewise in aligned spaced relationship with each other. Contained in each compartment 20 is a particle or matter 22 comprising an expandable synthetic resinous thermoplastic material.

In the preferred embodiment of the invention the expandable particles 22 are selected from those that heat up and foam rapidly in a high frequency electrical or RF field. In conducting experiments to determine suitable materials for particle 22, a Thermex 7 RB dielectric oven with a 7.5 kv. output at 27.32 megacycles per second was employed. The manufacturer estimates the peak RF voltage on the 15 inches by 15 inches electrodes at 20 kv. when the plate separation is 2.25 inches.

The dielectric heating of a material in an RF field may be due to dipole rotation or ionic oscillations. Since no two elements exhibit the same affinity for electrons, different atoms in a diatomic molecule produce structures in which the positive and negative centers do not coincide. The dipole moment is a measure of the polarity of a molecule. It is a product of either of two charges of opposite sign in a molecule and a distance between them. Thus, $\mu = ed$. The values of dipole moments are expressed in "Debyes," (the product of the electron charge, $e$ is about $10^{110}$ and the distance separating charge centers, $d$, is about $10^{18}$ centimeters, therefore $10^{118}$ e.s.u. is about 1 Debye.) When a molecule having a sufficiently high moment is in an alternating field it will tend to rotate as the sign of the electrode alternates. Different molecular groupings may exhibit widely differing values for the group moment.

Many of the vinyl aromatic monomers as for example, styrene and ortho-chlorostyrene or as abbreviated o-chlorostyrene, are generally classified as low-dielectric loss materials, that is, materials that heat up very slowly if at all when placed in an RF field.

It has been found, however, that polar vinyl monomers having a dipole moment of preferably at least 2 Debyes, and which are copolymerizable with vinyl aromatic monomers such as styrene and o-chlorostyrene greatly improve the dielectric heating behavior of these resins.

In addition, it has been found that additives of small organic polar molecules having a dipole moment of preferably at least 3 Debyes, to low-dielectric loss polymers such as styrene and o-chlorostyrene, will have a marked effect upon the response of the material to the RF field.

In using such additives and/or polar vinyl monomers to improve dielectric behavior, there are a number of parameters that should be observed in order to obtain optimum results. For example, the polar monomer that is employed alone or in conjunction with the small organic molecule must, of course, be copolymerizable with the vinyl aromatic monomer. Moreover, and as previously indicated, its polarity should be such as to have a dipole moment of at least 2 Debyes.

Certain parameters should also be observed in the use of the small inorganic molecule. It should have the capability of dissolving homogenously into the system, it should have the capability of being essentially polymerization noninhibiting, it should have a dipole moment of preferably at least 3 Debyes, and it should not cause too great a reduction of the heat distortion of the end product, particles 22. Furthermore, the molecular weight of the small organic molecule should be less than 200, should not have more than one aromatic ring constituent, and should have a length along its major axis of not more than 12.5 Angstroms.

The preparation of expandable compositions within these parameters is effected by polymerization of monomer mixtures containing blowing agents in sealed glass ampuls. A 40 cc. ampul is charged with about 25 cc. of fluid. Polymerization is carried out in steel jackets in a thermostated liquid bath. However, this invention is not restricted to that type of polymerization only. Polymerization can also be effected in flexible film containers under compression, and it can be carried out in emulsion or suspension. For an example of the steps employed in the latter method, reference can be had to U.S. Pat. No. 2,888,410. After the mixture is bulk, polymerized in the pressure vessel, cast expandable rods are obtained therefrom. These rods are sawed into ¼-inch thick discs for foaming studies. These discs are placed upon the lower electrode of the 27 mHz. Thermex dielectric oven. Measurements are made of the time to start foaming and to achieve maximum expansion in the RF field. After removal from the dielectric oven, the foam samples are allowed to remain exposed to the laboratory atmosphere for at least 24 hours prior to a density measurement by the water-immersion method.

Table 1 below shows the results obtained in testing materials suitable for particle 22. Citraconic anhydride (CA) and ethylacrylate (EA) are employed as the polar vinyl monomers for copolymerization with the vinyl aromatic monomer o-chlorostyrene. All samples exhibited a heat distortion temperature of greater than 70° C. As the samples expanded the moveable electrode is raised to permit free foaming. Total time required for expansion is approximately 10 seconds.

TABLE I

Expandable copolymer compositions from o-chlorostyrene with citraconic anhydride and ethylacrylate

| | Percent | | | | | Foam volume by RF heating | |
|---|---|---|---|---|---|---|---|
| No. | o-CS | CA | EA | DVB | $CF_2Cl_2$ | Expansion ratio | No. ft $-\frac{}{3}$ |
| 1-1 | 71.95 | 18 | 0 | 0.05 | 10 | 10.8 | 6.0 |
| 1-2 | 67.95 | 17 | 5 | 0.05 | 10 | 20.5 | 3.2 |
| 1-3 | 63.95 | 16 | 10 | 0.05 | 10 | 22.3 | 2.9 |
| 1-4 | 59.95 | 15 | 15 | 0.05 | 10 | 19.7 | 3.3 |
| 1-5 | 55.95 | 14 | 20 | 0.05 | 10 | 22.6 | 2.9 |
| 1-6 | 51.95 | 13 | 25 | 0.05 | 10 | 22.6 | 2.9 |
| 1-7 | 47.95 | 12 | 30 | 0.05 | 10 | 28.2 | 2.3 |

It is known that the cross-linked density of an expandable thermoplastic resin composition affects both the foamability and resistance to thermal collapse. In the normal steam molding process for styrene expandable granules, the temperatures do not exceed 125° C. and thermal collapse of the foam is not a serious problem. However, there is a high probability of local overheating in dielectric expansion of dry expandable resin formulations. Maximum resistance to thermal collapse of foam at temperatures as high as 150°–200° C. would appear to be important.

Divinylbenzene (DVB) is an effective cross-linking agent for vinyl aromatic polymers. The expandable compositions listed in table II below contain various amounts of DVB. 0.1 Benzoyl peroxide is used as the polymerization initiator during a schedule of 16 hours at 80° C. plus 8 hours at 120° C.

One-quarter-inch-thick discs are foamed in the dielectric oven as previously described. Vf/Vs is the ratio of the volume of the expandable composition at the finish of the foaming process to its volume at the start. Electrode spacing is 1.5 inches.

TABLE II

Effects of Divinylbenzene Concentration upon Foaming Behavior of [1]Chlorostyrene Copolymers by RF Heating

| No. | % DVB | Start (Secs.) | Finish (Secs.) | Vf/Vs |
|---|---|---|---|---|
| 2-1 | 0 | 15 | 23 | 6.0 |
| 2-2 | 0.02 | 13 | 26 | 18.0 |
| 2-3 | 0.05 | 14 | 26 | 21.5 |
| 2-4 | 0.08 | 14 | 28 | 24.3 |
| 2-5 | 0.12 | 16 | 29 | 6.3 |
| 2-6 | 0.20 | 23 | 30 | 3.1 |

[1] 62.22 percent o-chlorostyrene; 22.22 percent (EA); 15.56 percent (CA)—all samples contain 10 percent $CF_2Cl_2$ blowing agent.

It is seen that with no DVB (2-1), expansion begins in a short time but thermal collapse occurs rapidly and the sample edges, which usually start to form first, shrink before the center is fully expanded. The maximum-foaming volume is only 6.0. With 0.02–0.08 percent DVB (2-2 to 2-4) foaming is still very rapid but thermal collapse is prevented by prevention of lamella rupture and comparatively low-density stable foams are obtained. With 0.12 percent or more DVB (2-5 and 2-6) the elastic retractive forces are larger and the temperature at which foaming can occur increases.

The concentration of $CF_2Cl_2$ blowing agent is varied from 5–15 percent in a series of copolymer samples prepared in sealed ampuls. The monomer composition is identical to sample 2-3 in table II above. Electrode spacing is 1.5 inches.

TABLE III

Effects of $CF_2Cl_2$ Concentration upon Foaming Behavior of Chlorostyrene Copolymers by RF Heating

| No. | % $CF_2CL_2$ | Start (Secs.) | Finish (Secs.) | Vf/Vs |
|---|---|---|---|---|
| 3-1 | 5 | 18 | 37 | 14.5 |
| 3-2 | 8 | 17 | 28 | 16.5 |
| 3-3 | 10 | 15 | 27 | 24.0 |
| 3-4 | 13 | 11 | 30 | 24.1 |
| 3-5 | 15 | 9 | 30 | 26.0 |

There is evidence of fluid $CF_2Cl_2$ which has separated from the polymer in samples charged with greater than 10 percent $CF_2Cl_2$. It is apparent from the data in table III that maximum expansion is approached with about 10 percent $CF_2Cl_2$ in samples prepared as previously described.

The excellent behavior of pentane as a blowing agent for expandable polystyrene granules is well known. An expandable resin casting is prepared by the pressure technique from the following materials:

74.7 percent o-chlorostyrene
18.5 percent β-hydroxyethyl acrylate
0.05 percent of divinylbenzene
6.65 percent n-pentane
0.1 percent benzoyl peroxide A pressure of 120 p.s.i.g. is maintained on the surface of an aqueous $ZnCl_2$ solution in which the 0.9 inch diameter by 8-inch-long Tedlar film bag is immersed. The polymerization schedule is 18 hours at 80° C. plus 5 additional hours at 120° C. The void and bubble free casting is sliced into 0.25-inch-thick discs to study the foaming behavior in an RF field. It is found that the foam samples removed after 72.5 and 75 seconds have an excellent uniform fine-cell structure. The expansion ratio of these samples are 30–31 volumes. This expansion represents very close to 100 percent efficiency of the pentane as a blowing agent as calculated from PVT relationships.

Compositions similar to those shown in table I are prepared with other vinyl aromatics. Table IV summarizes the data obtained on the foaming behavior of these materials in the 27 mHz. dielectric oven. Electrode spacing is 2 inches.

TABLE IV

Foaming Data For Other Vinyl Aromatic Copolymers

| No. | Vinyl Aromatic[1] | Start (Sec.) | Finish (Secs.) | Vf/Vs |
|---|---|---|---|---|
| 4-1 | Styrene | 59 | 103 | 15.8 |
| 4-2 | Vinyl toluene | 63 | 108 | 17.7 |
| 4-3 | 3,4-Dichlorostyrene | 17 | 44 | 23.0 |
| 4-4 | o-Chlorostyrene | 33 | 65 | 19.9 |

[1] 62.22 percent vinyl aromatic; 22.18 percent ethylacrylate; 15.55 percent citraconic anhydride; 0.05 percent DVB; resin composition: 10 percent $CF_2Cl_2$ added as blowing agent.

The foregoing samples involved the copolymerization of a polar vinyl monomer and a vinyl aromatic monomer to obtain a copolymer sensitive temperaturewise to a high-frequency electrical field. As previously mentioned, additives of small polar organic molecules within the parameters described can also have a marked effect on the heating behavior of vinyl aromatic polymers. Poly (chlorostyrene) containing the small polar molecule benzonitrile is prepared from the following materials wherein benzoyl peroxide is used as the polymerization initiator, n-pentane as the blowing agent, and divinylbenzene as the cross-linking agent.

83.20 percent o-chlorostyrene
10.00 percent benzonitrile
0.05 percent divinylbenzene
6.65 percent n-pentane
0.10 percent benzoyl peroxide The resin casting is sliced into 0.25-inch-thick discs and placed in an RF field. Foaming is rapid and the foam sample has an excellent uniform cell structure.

In combination with expandable particles 22 which will foam rapidly in a high-frequency field, films 12 and 14 composed of low-dielectric loss materials are advantageously employed. These films are characterized in that they heat up slowly if at all when placed in an RF field. As specific examples only, films 12 and 14 can comprise polystyrene, polyethylene, or polypropylene. The amounts of polar substances such as small polar molecules in such films if any, should not be such as to cause the films to react significantly to an RF field.

Figure 3:
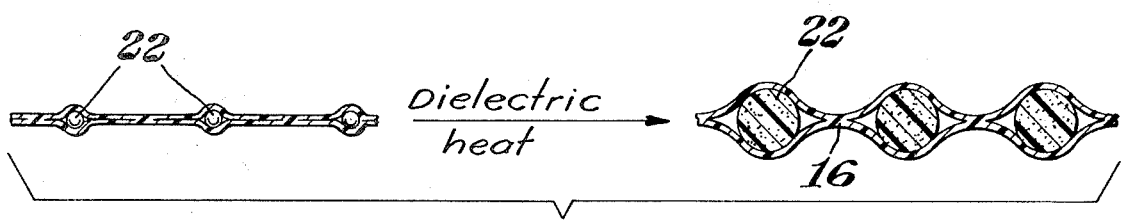
FIG. 3 is a view like FIG. 2 only showing the expansion of the flexible cushion-packaging material.

British Pat. No. 922,547 illustrates in some detail a method of expanding an expandable synthetic resinous thermoplastic material by placing the material in a high-frequency electrical field. In these teachings sophisticated apparatus is taught wherein a conveyor belt is employed to deliver the material to between the electrodes. The upper electrode diverges from the lower one to allow for free foaming of the particles as they expand. Apparatus of this general type would be applicable in performing the method as depicted in FIG. 3. Thus, in FIG. 3, the material 10 in its dense state is directed between two electrodes (not shown) whereby the particles 22 are expanded to a cellular, low-density state. The particles can be generally in spherical shape as shown although most any shape can be employed regular or otherwise. For example, the expandable particles 22 could be in the form of discs or chopped up strands. As a specific example, particles 22 can be about one-sixteenth an inch in diameter and can comprise the sample composition 1-6 listed in table I above. Film layers 12 and 14 can comprise 2-mil-thick polyethylene film. The 7.5 kw. 27.32 mHz. dielectric-heating unit described can be employed for foaming purposes and with the electrode spacing set at 1 inch. The particles 22 become heat plastified and expand to about 23 times their initial volume in about 10 seconds. Material 10 now ready for usage as cushion packaging material, is shown at the right-hand side of FIG. 3.

Other forms of the invention include the use of expandable synthetic thermoplastic particles 22 which can be expanded by conduction or radiant heating processes, as for example, by steam or infrared rays. Polypropylene, polyethylene, polyethyleneterephthalate, and polyvinyl fluoride films, as well as many others known to the art, melt at temperatures higher than that required to foam known expandable synthetic resinous thermoplastic materials. If such expandable materials or particles are sealed in compartments 20 between films 12 and 14 composed of a film having a sufficiently high melting point, expansion can be carried out by the above described conventional methods without serious damage or degradation of the film. U.S. Pat. No. 2,848,428 illustrates one example of an expandable material that foams at temperatures of about 130° C. Accordingly, this expandable material in the form of particles 22, can be used in combination with one of the above enumerated films to obtain the highly advantageous cushion-packaging material of the present invention.

While certain representative embodiments and details have been shown for the purpose of illustration the invention, it will be apparent to those skilled in the art that various changes and modifications can be made therein without departing from the spirit and scope of the invention.

Accordingly what is claimed as new is:

1. A packaging material comprising upper and lower layers of flexible synthetic resinous film disposed in generally superposed relationship, said film layers being secured to each other in a matrix like fashion to form therebetween a plurality of connected compartments, matter contained within said compartments, respectively, said matter comprising an expandable synthetic resinous material, said compartments being relatively large compared to the volume of said expandable matter contained therewithin.

2. The packaging material of claim 1 wherein said expandable matter comprises a material that can be expanded within said compartments by radiant or conduction-heating processes.

3. The packaging of claim 1 wherein said matter is in its expanded low-density cellular state.

4. The packaging material of claim 1 wherein said compartments are sufficiently large to accommodate the expansion of said expandable material therewithin to a volume at least 10 times greater than its initial volume in said compartments.

5. The packaging material of claim 1 wherein said expandable material comprises material that can be heat expanded by dielectric-heating methods, said film layers comprising material sufficiently nonsensitive to dielectric-heating methods such that said expandable matter can be expanded inside said compartments by said method without serious heat damage to or heat degrading of the film layers.

6. The packaging material of claim 5 wherein said expandable matter comprises a copolymer of a polar vinyl monomer and a vinyl aromatic monomer, said polar vinyl monomer having a dipole moment of at least 2 Debyes.

7. The packaging material of claim 6 wherein said vinyl aromatic monomer is selected from the group consisting of o-chlorostyrene, styrene, vinyl toluene, and 3,4-dichlorostyrene.

8. The packaging material of claim 6 wherein said polar vinyl monomer is selected from the group consisting of citraconic anydride, ethylacrylate, and β-hydroxyethyl acrylate.

9. The packaging material of claim 6 wherein said copolymer includes an additive comprising a cross-linking agent.

10. The packaging material of claim 6 wherein said copolymer includes an additive of small polar organic molecule, said molecule having the capabilities of dissolving uniformly into the system, being essentially polymerization noninhibiting, having a dipole moment of at least 3 Debyes, said organic molecule further characterized as having a molecular weight of less than 200, as having no more than one aromatic vinyl constituent, and as having a length along its major axis of no more than 12.5 Angstroms.

PO-1050
(5/69)

UNITED STATES PATENT OFFICE
CERTIFICATE OF CORRECTION

Patent No. 3,616,158     Dated 26 October 1971

Inventor(s) Louis C. Rubens

It is certified that error appears in the above-identified patent and that said Letters Patent are hereby corrected as shown below:

Column 2, line 36, delete "$10^{110}$" and insert -- $10^{-10}$ --; in line 37, delete "$10^{18}$" and insert -- $10^{-8}$ --; also in line 37 delete "$10^{118}$" and insert -- $10^{-18}$ --.

Signed and sealed this 16th day of May 1972.

(SEAL)
Attest:

EDWARD M. FLETCHER, JR.
Attesting Officer

ROBERT GOTTSCHALK
Commissioner of Patents